UNITED STATES PATENT OFFICE.

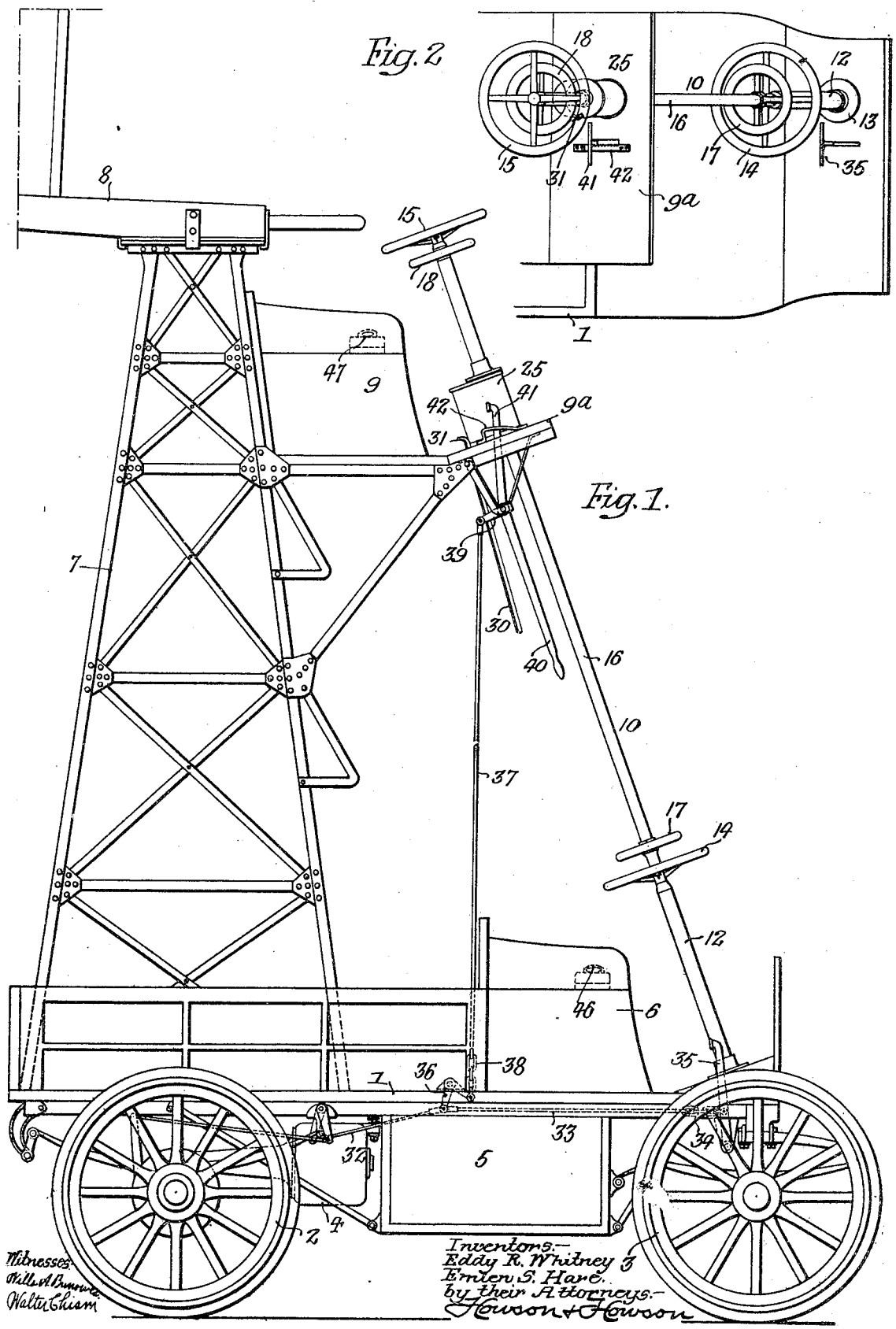

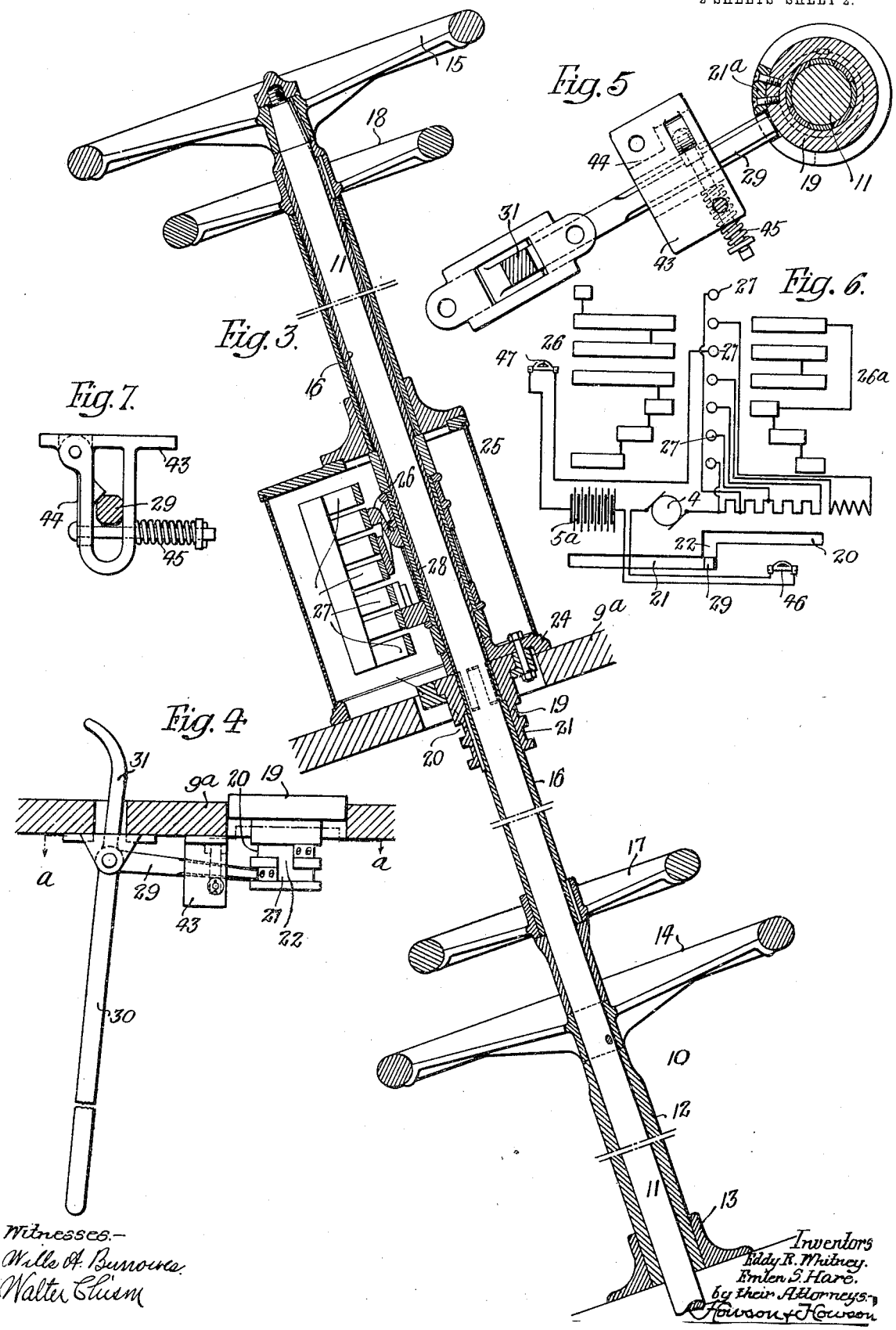

EDDY R. WHITNEY AND EMLEN S. HARE, OF PHILADELPHIA, PENNSYLVANIA, ASSIGNORS TO COMMERCIAL TRUCK COMPANY OF AMERICA, OF PHILADELPHIA, PENNSYLVANIA, A CORPORATION OF PENNSYLVANIA.

LAMP-TRIMMER'S WAGON.

1,053,080.

Specification of Letters Patent.   Patented Feb. 11, 1913.

Application filed May 2, 1911.   Serial No. 624,587.

*To all whom it may concern:*

Be it known that we, EDDY R. WHITNEY and EMLEN S. HARE, citizens of the United States, and residents of Philadelphia, Pennsylvania, have invented certain Improvements in Lamp-Trimmers' Wagons, of which the following is a specification.

Our invention relates to that class of vehicles particularly designed for use in trimming street arc lamps, and one object is to provide a wagon of this type with means whereby its operation may be controlled both from a seat mounted on its body portion in the ordinary manner and position, and also from some point at or adjacent the top of the tower with which the wagon is provided, thus rendering it possible for the wagon to be used and operated by a single person.

We further desire to provide a lamp trimmer's wagon of the type above noted with a novel arrangement of controlling, steering, and brake mechanism whereby it shall be possible to manipulate or control said mechanism from either of two positions some distance apart.

Another object of our invention is to provide a tower wagon with brake mechanism having operating means which may be set from two points adjacent a seat on the body of the wagon and may also be set or released by the manipulation of a single operating device adjacent a second seat; it being also desired that such second seat shall be mounted at or adjacent the top of the tower of the wagon in order to permit of the operation and control of the said wagon by a lamp trimmer on the tower.

We further desire to provide a lamp trimmer's wagon with novel means whereby the flow of current from the storage battery carried thereby to the motor or motors for driving the wagon may be controlled from either of two seats, either with or without a novel device for reversing the motors from either of two positions.

Another object of the invention is to provide a tower wagon with steering and control posts of novel construction having steering and controlling wheels for governing the speed of the wagon as well as its direction of movement; the invention also contemplating a novel arrangement of electric switches whereby an operator on the tower is enabled to prevent starting of the vehicle from the mechanism at the lower portion thereof.

We also desire to provide a lamp trimmer's wagon with means for controlling and operating the same from two points of which one is at or adjacent the top of the tower, which means shall include an elongated steering and control post of a construction particularly designed to prevent the jamming of any of its parts owing to the bending strains set up under operating conditions.

These objects and other advantageous ends we secure as hereinafter set forth, reference being had to the accompanying drawings, in which:—

Figure 1, is a side elevation of a lamp trimmer's wagon constructed according to our invention; Fig. 2, is a plan of the steering and control mechanism shown in Fig. 1; Fig. 3, is an enlarged vertical section of the steering and controlling post with the electric controller associated therewith; Fig. 4, is a side elevation, partly in section, illustrating part of the reverse controlling mechanism; Fig. 5, is a horizontal section on the line *a—a*, Fig. 4; Fig. 6, is a diagrammatic development of the controller contacts and bushes, showing the relation thereto of the guide for limiting the revolution of the controller drum, and Fig. 7, is a side elevation partly in section of a detail of the invention.

In the above drawings, 1 represents the body of a wagon provided with suitable running gear having wheels 2 and 3 of which the rear pair is driven by an electric motor 4 supplied with current from a storage battery usually carried in a compartment or casing 5 hung under the body of the vehicle. A seat 6 is mounted on the body at the front part of the wagon, while the rear part thereof carries a relatively light tower or elevated structure 7 preferably made of rolled steel sections and having mounted on its top a horizontally movable platform 8 which may be overhung and otherwise constructed as found desirable in any particular case.

Adjacent the top of the tower and mounted on the front part thereof is a second seat 9 preferably so placed that it does not interfere with the turning of the platform on the top of the tower and yet in such a position as to be conveniently entered by an operator without necessitating his descent from said tower.

For controlling the operation of the wagon we provide a steering and controlling post 10 consisting of an elongated, upwardly extending and rearwardly inclined shaft 11, whose lower part extends through and is guided by a tubular post 12 mounted on the front portion of the body of the vehicle in any desired and suitable manner; being in the present instance reinforced by a stanchion 13. The lower end of the shaft 11 is connected to the steering gear of the vehicle in any of the ways known in the art and the construction of this part of the device has not been further shown in detail, since in itself it forms no part of the present invention.

Just above and adjacent the lower seat 6 there is fixed to the shaft 11 a lower steering wheel 14, and a second or upper steering wheel 15 is fixed to the upper end of said shaft slightly above and adjacent the upper seat 9.

Loosely mounted on and guided by the shaft 11 between the steering wheels 14 and 15 is a sleeve 16 having keyed to it immediately above the lower steering wheel a controller wheel 17, and also having similarly fixed to it a second controller wheel 18 immediately under and adjacent the upper steering wheel 15. To prevent any possible binding of this tubular sleeve 16 on the shaft 11, we preferably make it as shown in Fig. 3 in two sections, whose adjacent ends are provided with alternating recesses and projections so as to intermesh with each other, although the ends of the projections are spaced a greater or less distance away from the bottoms of the recesses in order to permit of some relative longitudinal movement of said sections.

Adjacent the point at which the shaft 11 and tubular sleeve 16 pass through the foot board 9ª of the seat 9, we key to the said sleeve a collar 19 in which are a pair of annular grooves 20 and 21 connected by a vertically extending portion 22 as shown in Figs. 4 and 6. This collar is held from longitudinal movement while being free to rotate, by means of a flanged member 23 bolted to the bottom structure 24 of an electric controller 25 having a series of fixed brushes or fingers 27 and corresponding contacts 26 and 26ª mounted on a sleeve 28 of insulating material fixed to and movable with the tubular sleeve 16.

As indicated in Fig. 6, these brushes and contacts are so arranged and connected that movement of the controller wheels 17 and 18 with the sleeve 16, in one direction, would supply current to the motor to cause the armature thereof to so revolve as to drive the vehicle forward. When said controller is turned from its off position in an opposite direction the current is so delivered to the motor that this drives the vehicle to the rear. In order to prevent the controller being moved to the reverse position when it is desired to merely turn it from the on to the off position, we provide a lever having an arm 29 whose free end enters one or the other of the two annular grooves 20 or 21 and is capable of passing from one groove to the other through the passageway 22. This lever arm has connected to it a downwardly extending arm 30 which projects from a point within easy reach of the hand of an operator on the seat 6 and it also has a third arm 31 which projects upwardly through the foot board 9ª into such position as to be operable by the foot of a driver on the seat at the top of the tower.

For operating the brake mechanism of the vehicle we connect the link or rod 32 from the brake gear on the body 1 through a rod 33 and a length of chain 34 to a foot lever 35 so placed as to be operable by a driver on the seat 6. The point of junction of the two members 32 and 33 is also connected through a bell crank lever 36 and a rod 37 which includes a length of chain 38, with a lever 39 having an operating arm 40 which also extends above and adjacent the seat 6 so as to be within reach of the hand of a driver thereon. Said lever also has an upwardly extending arm 31 which projects through the foot board 9ª so as to be operative by the foot of a driver on the seat 9; there being provided a ratchet 42 on said foot board for the purpose of retaining this arm 41 and consequently the brake mechanism in any desired set position.

Under conditions of use the vehicle may be controlled by a driver on the seat 6, who is at liberty to operate the brake mechanism of the vehicle through the foot lever 35 and who can steer the wagon by means of the hand wheel 14. Moreover, the wagon may be caused to move forward or back by a suitable manipulation of the controller wheel 17; it being noted that the hand lever 30 is so set as to cause its arm 29 to operate in the groove 21, for example, when it is desired that the vehicle shall move forward for a definite direction of movement of said wheel 17. Thus by turning said wheel in one direction the various contacts and brushes 26 and 27 engage each other in the predetermined manner and start and accelerate the motor as said wheel is moved farther from its off position.

When the wheel is turned back, current is cut off from the motor and finally further movement of the wheel to the rear is prevented by reason of the engagement of a stop 21ª (Fig. 5) with the end of the lever arm 29. At this time the passage 22 between the two grooves 20 and 21 is immediately above said lever arm, so that if it be desired to reverse the direction of movement of the vehicle, it is only necessary for the operator to pull forward the lever arm 30, whereupon the arm 29 passes through the opening 22 into the annular groove 20. Thereafter it is possible to continue the movement of the controller wheel 17 beyond its off position, and as will be understood by those skilled in the art, the electric motor is supplied with current through the contacts and brushes shown in Fig. 6, so as to be reversed.

If it be desired to control the vehicle from the upper seat 9, the hand lever 40 is so moved as to cause the lever arm 41 connected thereto to engage the ratchet 42 to maintain the brakes "set". Thereafter the operator may mount the tower to the seat 9 and after releasing the brakes by foot power exerted on the lever 41 to free it from the ratchet 42, may start the motor by properly turning the controller wheel 18 and steer the vehicle by operating the wheel 15. As is obvious, the ability to turn the upper controller wheel 18 to reverse the motor may be governed by the foot lever 31 and in order to maintain this latter lever with its associated arms in any given position while leaving it free to be moved therefrom upon the exertion of sufficient force, we provide a bracket 43 on the under side of the foot board 9ª and mount in this a lever 44 having a projection, as shown in Fig. 7, held at all times by a spring 45 in such position that accidental movement of the lever arm 29 and its connected parts is prevented. With this arrangement of apparatus, the wagon may be run by a single operator from lamp to lamp without requiring his descent from the top of the tower, since he can perfectly control the operation of the wagon from the seat 9. Before descending from the tower to the seat 6, the brakes of the wagon would, if necessary, be set by bringing the lever 41 into engagement with the ratchet 42, and it will be noted that by the use of the chains 34 and 38 this lever as well as the lever 35 may be operated independently of each other.

By arranging the two controller handles 17 and 18 between the steering wheels 14 and 15 we are enabled to mount the controller 25 in the position shown without causing any complications in the wiring or requiring any special or complicated mechanism for its operation. Moreover, by providing the upper brake lever 41 with the downward extension 40, it is possible for an operator to apply the brakes while he is in the seat 6, and after mounting to the platform 8 for the purpose of trimming or adjusting a lamp, to release the brakes and start the wagon from the upper seat, merely by releasing the lever 41 from its ratchet and operating the upper control wheel.

It is obvious that while the particular vehicle illustrated in the drawings is primarily intended for use in trimming lamps, other elevated structures may be substituted for the tower 7 without departing from our invention, which contemplates broadly the provision of wagon controlling mechanism capable of being operated either from some point on the elevated structure or from the body of the vehicle; certain parts of said mechanism being intended for operation from any one of two and if desired, three positions.

In some cases it may be advisable to provide means under the control of an operator on the tower whereby he may prevent the wagon from being started from the lower seat, even though the electric controller be operated, and with this idea in view, we provide two switches 46 and 47 in series with the main motor circuit, mounting them respectively adjacent the lower seat and the upper part of the tower. With this arrangement the opening of the upper switch very effectually prevents the accidental or malicious starting of the vehicle while the operator is engaged at the upper part of the tower or other structure.

We claim:—

1. The combination of a vehicle having an elevated structure and a body portion; mechanism including an electric motor for driving said vehicle; a controller for said motor; and a plurality of operating members connected to said controller and respectively mounted in positions to permit of their actuation from the elevated structure and from said body portion.

2. A vehicle having mounted on it an elevated structure; brake mechanism for said vehicle; means at the upper part of the elevated structure for mechanically actuating said brake mechanism and including an operating member extending into position to permit of its actuation from the body of the vehicle; and other brake actuating means operative from the body of the vehicle.

3. A vehicle having mounted on it an elevated structure; a driver's seat at the upper part of said structure; a second driver's seat on the body of the vehicle; brake mechanism for the vehicle; and devices adjacent each of said seats for mechanically actuating said brake mechanism; one of said devices having a member extending so as to be operative from either seat.

4. A vehicle having mounted on it an elevated structure; a motor for driving the vehicle; steering gear for the vehicle including two operating members of which one is placed to be actuated from the body of the vehicle and the other extends in position to be operated from the upper portion of the elevated structure; a controller for the motor mounted between said steering gear operating members; and controller operating members mounted respectively below and above the operating members for the steering gear.

5. A vehicle having mounted on it a tower structure; steering gear for said vehicle including a shaft extending to a point adjacent the upper portion of the tower structure; with hand operating devices mounted on the shaft of which one is in position to be operated from the body of the vehicle and the other is placed to be operated from the tower structure.

6. A vehicle having mounted on it an elevated structure; a motor for driving the vehicle; a battery for supplying current to said motor; and an electric controller; with means for operating said controller, the same including two hand operated devices both capable of actuating the controller of which one device is adjacent the upper portion of the elevated structure and the other is in position to be operated from the body of the vehicle.

7. A vehicle having mounted on it an elevated structure; steering gear for the vehicle including a shaft extending adjacent the upper portion of said elevated structure; two steering wheels connected to said shaft, one adjacent the upper part of the elevated structure and the other in position to be operated from the body of the vehicle; electric operating means for the vehicle including an electric controller; and controller operating members respectively adjacent said two steering wheels.

8. An electric vehicle having an elevated structure; mechanism for actuating said vehicle; controlling means for said mechanism consisting of two controller operating devices of which one is in position to be operated from the upper portion of the elevated structure and the other is placed to be operated from the body of the vehicle; a structure operatively connecting said devices; and a controller mounted between said operating devices so as to be actuated from said connecting structure.

9. A vehicle having driving mechanism and provided with an elevated structure; steering gear for said vehicle including a shaft extending adjacent the upper portion of said elevated structure; two steering wheels on said shaft one of which is placed to be operated from the body of the vehicle and the other is adjacent the upper portion of the elevated structure; a tubular shaft mounted on said first shaft; two hand operating devices for actuating said second shaft mounted adjacent the two steering wheels respectively; with a controller for said driving mechanism operatively connected to the second shaft and mounted between said two hand operating devices.

10. A vehicle provided with electrical actuating means and having mounted on it an elevated structure; an electric controller; means for actuating said controller consisting of two hand operated devices adjacent the body of the vehicle and the upper part of the elevated structure respectively; and reversing means including a member extended to be operative either from the upper part of the elevated structure or from the body of the vehicle.

11. A vehicle having electrical propelling mechanism and provided with an elevated structure; an electric controller; means for operating said controller either from the upper part of the elevated structure or from the body of the vehicle; and a device for governing the reversal of the electrical propelling mechanism including a lever placed to be operated both from the upper part of the elevated structure and from the body of the vehicle.

12. A vehicle having mounted on it an elevated structure; braking mechanism for said vehicle; two seats for the vehicle of which one is mounted on the body portion thereof and the other is fixed to the upper part of the elevated structure; brake actuating means consisting of an operating member adjacent the lower seat, and a second operating member adjacent the upper seat, said latter member being extended downwardly into position to permit of its operation from the lower seat.

13. A vehicle having mounted on it an elevated structure provided with brake mechanism; a seat mounted on said elevated structure; a second seat on the body of the vehicle; operating means for said brake mechanism including an actuating member placed to be operative from the seat on the body of the vehicle, and a second actuating member in the form of a foot lever placed to be operative from the upper portion of the elevated structure; said foot lever having a downward extension in the form of a hand lever projecting in position to permit of its operation from the seat on the vehicle body.

14. A vehicle provided with an elevated structure and having two seats of which one is mounted on the upper portion of said structure; a steering shaft extending adjacent both of said seats; two steering wheels on said shaft respectively adjacent the seats; driving means for the vehicle including a controller mounted adjacent the shaft; a tubular shaft mounted on said first shaft and operatively connected to said controller; and two controller operating wheels mounted on said tubular shaft between the two steering wheels, said tubular shaft being made in two loosely connected sections.

15. A vehicle having electrical operating means and provided with a controller for said means; two seats for the vehicle, one above the other; said controller including a revoluble member provided with two parallel grooves connected to each other; a member projecting into one of said grooves and operative in either of them; with means operative from either seat for shifting said member from one to the other to limit the possible amount of revolution of the revoluble controller member in a definite direction.

16. A vehicle having electrical operating means and provided with a controller for said means, said controller including revoluble member provided with two parallel grooves connected to each other and having two sets of contacts respectively corresponding to the forward and reverse movements of the vehicle; with a lever having an arm extending into one of said grooves and operative in either of them for limiting the operation of said revoluble member to either of said two sets of controller contacts.

17. A vehicle having electrical operating means and provided with a controller for said means, said controller including a revoluble member provided with two parallel grooves connected to each other and having two sets of contacts respectively corresponding to the forward and reverse movements of the vehicle; with a lever having an arm extending into one of said grooves and operative in either of them for limiting the operation of said revoluble member to either of said two sets of controller contacts; and a device for preventing free movement of said lever.

18. The combination of a vehicle having a body portion; a tower thereon; a seat supported at the upper part of the tower; mechanism including an electric motor for driving said vehicle; a controller for said motor and a plurality of operating members connected to said controller and respectively mounted in positions to permit of their actuation from a point adjacent the seat and from the said body portion respectively.

In testimony whereof, we have signed our names to this specification, in the presence of two subscribing witnesses.

EDDY R. WHITNEY.
EMLEN S. HARE.

Witnesses:
WILLIAM E. BRADLEY,
WM. A. BARR.